United States Patent [19]

Valoppi

[11] Patent Number: 5,506,275
[45] Date of Patent: Apr. 9, 1996

[54] 1,1,1,2-TETRAFLUOROETHANE AS A BLOWING AGENT IN INTEGRAL SKIN POLYURETHANE SHOE SOLES

[75] Inventor: Valeri L. Valoppi, Riverview, Mich.

[73] Assignee: BASF Corporation, Mt. Olive, N.J.

[21] Appl. No.: 442,235

[22] Filed: May 15, 1995

[51] Int. Cl.$^6$ .......................................................... C08J 9/34
[52] U.S. Cl. ............................ 521/51; 521/131; 521/174; 521/176
[58] Field of Search ............................. 521/51, 131, 174, 521/176

[56] References Cited

U.S. PATENT DOCUMENTS

| | | |
|---|---|---|
| 5,194,325 | 3/1993 | Jones . |
| 5,250,579 | 10/1993 | Smits et al. . |

FOREIGN PATENT DOCUMENTS

| | | |
|---|---|---|
| 0477920A2 | 4/1992 | European Pat. Off. . |
| 0553848A2 | 8/1993 | European Pat. Off. . |
| 040356542A | 12/1992 | Japan . |
| 040359935A | 12/1992 | Japan . |
| 050051478A | 3/1993 | Japan . |
| 050086223 | 4/1993 | Japan . |
| 05255472 | 10/1993 | Japan . |
| WO91/09077A1 | 6/1991 | WIPO . |

*Primary Examiner*—Morton Foelak
*Attorney, Agent, or Firm*—Mary E. Golota

[57] ABSTRACT

It has been found that 1,1,1,2-tetrafluoroethane (HFC-134a) may be used alone or in combination with water as blowing agents in flexible integral skin foams. Foams prepared using HFC-134a alone or in combination with water exhibit physical characteristics such as resistance to abrasion and cracking on flex comparable to conventional chlorinated fluorocarbon blown foams. The foams of the present invention are suitable for use in shoe sole applications.

6 Claims, No Drawings

1,1,1,2-TETRAFLUOROETHANE AS A BLOWING AGENT IN INTEGRAL SKIN POLYURETHANE SHOE SOLES

1. BACKGROUND OF THE INVENTION

The present invention relates to an integral skin polyurethane foam composition and a process for preparing said foam. In particular, the invention relates to those foams utilizing 1,1,1,2-tetrafluoroethane (HFC-134a) alone or as a co-blowing agent with water, which are useful in shoe sole applications. The use of HFC-134a and optionally water obviates the need to use the ozone depleting chlorofluorocarbons in polyurethane shoe sole systems.

2. DESCRIPTION OF THE RELATED ART

Integral skin foams are well known to those skilled in the art of polyurethane foams. Such foams have a cellular interior and a higher density microcellular or non-cellular skin. In general, to prepare such foams one reacts an organic isocyanate with a substance having at least one isocyanate reactive group in the presence of a catalyst, blowing agent, and a variety of optional additives. The reaction is carried out in a mold where a higher density skin forms at the interface of the reaction mixture and the relatively cool inner surface of the foam.

At the present time, the most common type of blowing agent used in integral skin polyurethane foams is chlorofluorocarbons (CFCs) or combinations of CFCs and other blowing agents. Industry today, however, is faced with a mandate to reduce and eventually eliminate the use of CFCs. To this end, much energy is being devoted.

Past methods of preparing integral skin polyurethanes with CFCs as a blowing agent includes G.B. Patent No. 1,209,297, which teaches the use of a combination blowing agent consisting of a CFC and hydrate of an organic compound which splits off water at temperatures above 40° C. This blowing agent or combination of agents was used in a formulation with a suitable polyisocyanate, a polyol-containing hydroxyl group, and a catalyst. This patent discloses the undesirability of having free water in the system. The patent states that the presence of even small quantities of water produce a skin that is permeated with fine cells.

U.S. Pat. No. 4,305,991 describes a process for preparing integral skin polyurethane foams wherein a polyisocyanate containing aliphatically and/or cycloaliphatically bound isocyanate groups is reacted with polyhydroxyl compounds containing ether linkages, a chain extender, a catalyst, additives, and a blowing agent. The blowing agent is characterized as a readily volatile organic substances, examples of which include both halogenated and nonhalogenated volatile organic compounds to which water may be added as a chemical blowing agent.

More recently, attempts have been made to evaluate the performance of alternate blowing agents to CFCs. In a paper by J. L. R. Clatty and S. J. Harasin entitled, *Performance of Alternate Blowing Agents to Chlorofluorocarbons in RIM Structural and Elastomeric Polyurethane Foams*, presented to the 32nd Annual Polyurethane Technical/Marketing Conference, October 1989, the authors addressed the use of water as a blowing agent for integral skin polyurethane reaction injection molded systems (RIM). In this application, the water concentration in the system is controlled by the concentration and type of molecular sieves used. As in the Great Britain patent discussed previously, the water is not in a free form but bound in some manner. In this instance, the authors state that this process is limited to use in rigid foam systems; and the flexible integral skin formulations may best be served by using HCFCs or HCFC-22 as substitutes for CFCs.

Integral skin foams prepared for use in shoe soles must not only have a cosmetically acceptable appearance but must also exhibit enhanced resistance to abrasion and cracking on flex. It has been found that foams utilizing HFC-134a as the blowing agent alone or in combination with water can be prepared which meet the stringent requirements inherent in shoe sole applications.

3. SUMMARY OF THE INVENTION

Prior processes have used CFCs, HCFCs, volatile organic alkanes such as pentane and heptane, and water either alone or in combination as the blowing or density control agent in integral skin polyurethane foams.

It is the object of the present invention to provide a flexible, low density, integral skin polyurethane foam capable of use in shoe sole applications; wherein, the integral skin foam uses no CFCs, HCFCs, or volatile organic alkanes such as pentane or heptane as blowing agents. This flexible integral skin foam, comprises:

A) a polyisocyanate component,

B) isocyanate reactive polyols having a functionality of at least 1.5,

C) 1,1,1,2-tetrafluoroethane as a blowing agent,

D) optionally, water as a co-blowing agent,

E) a catalyst capable of promoting urethane formation,

F) a chain extender,

G) optionally a surfactant,

H) optionally an essentially linear alcohol having from 10 to 20 carbons, and

I) optionally fillers, pigments, antioxidants, and stabilizers.

The general process comprises reacting a polyisocyanate component with an isocyanate reactive compound. This is done in the presence of a catalyst of a type known by those skilled in the art in sufficient quantity to catalyze the reaction, 1,1,1,2-tetrafluoroethane in an amount sufficient to act as a blowing agent or optionally as a co-blowing agent with water; a surfactant which when used acts not only as a cell regulating agent but also as an emulsifying agent to keep the gaseous HFC-134a in solution; a chain extender; and optionally a $C_{10-20}$ alcohol, fillers, pigments, antioxidants, and stabilizers.

The organic polyisocyanates used in the instant process contain aromatically bound isocyanate groups. Representative of the types of organic polyisocyanates contemplated herein include, for example, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, hexahydrotoluene diisocyanate, 1,5-naphthalene diisocyanate, 1-methoxy-2,4-phenylene diisocyanate, 4,4'-biphenylmethane diisocyanate, 4,4'-biphenylene diisocyanate, 3,3'-dimethyl-4,4'-diphenylmethane diisocyanate, 3,3'-4,4'-diphenylmethane diisocyanate, and 3,3'-dimethyldiphenylmethane-4,4'-diisocyanate; the triisocyanates such as 4,4', 4"-triphenylmethane triisocyanate, polymethylene polyphenylene polyisocyanate, and 2,4,6-toluene triisocyanate; and the tetraisocyanates such as 4,4-dimethyl-2,2'-5,5'-diphenylmethane tetraisocyanate. Especially useful due to their availability and properties are 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Included within the usable isocyanates are the modifications of the above isocyanates which contain carbodiimide, allophanate, alkylene, or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound determined by the well-known Zerewitinoff Test, as described by Kohler in *Journal of the American Chemical Society*, 49, 3181 (1927). These compounds and their methods of preparation are well known in the art. The use of any one specific active hydrogen compound is not critical hereto; rather, any such compound can be employed herein. Generally, the quasi-prepolymers have a free isocyanate content of from 20 percent to 40 percent by weight.

Mixtures of polymeric diphenylmethane diisocyanate (polymeric-MDI) and carbodiimide or urethane-modified MDI are preferred.

Any suitable polyoxyalkylene polyether polyol may be used such as those resulting from the polymerization of a polyhydric alcohol and an alkylene oxide. Representatives of such alcohols may include ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures, epihalohydrins such as epichlorohydrin, as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process, such as the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Other polyoxyalkylene polyether polyols which may be employed are those which contain grafted therein vinylic monomers.

The polyols which have incorporated therein the vinylic polymers may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056; the disclosures of which are herein incorporated by reference, or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one percent to 60 percent, preferably from 10 percent to 40 percent, based on the total weight of the product. The polymerization occurs at a temperature between about 80° C. and 170° C., preferably from 75° C. to 135° C.

The polyols which may be employed in the preparation of the graft polymer dispersions are well known in the art. Both conventional polyols essentially free from ethylenic unsaturation such as those described in U.S. Pat. No. Re. 28,715 and unsaturated polyols such as those described in U.S. Pat. Nos. 3,652,659 and U.S. Pat. Re. 29,014 may be employed in preparing the graft polymer dispersions used in the instant invention, the disclosures of which are incorporated by reference.

Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927; and 3,346,557, the disclosures of which are incorporated by reference.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate, or epoxy group; or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dime thylaminostyrene, acetoxystyrene, methyl-4-vinylbenzoate, phenoxystyrene, p-vinyldiphenyl sulfide, p-vinylphenyl phenyloxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetam, inoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyltoluene, vinylnaphthalene, vinyl bromide, vinylfluoride, vinylidene bromide, 1-chloro- 1-fluoroethylene, vinylidene fluoride, vinyl methyl ether, vinyl ether, vinyl propyl ether, vinyl butyl ether, vinyl 2-ethylhexyl ether, vinyl phenyl ether, vinyl 2-butoxyethyl ether, 2,4-dihydro- 1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(β-chloroethyl)vinyl phosphonate, vinyl ethyl sulfide, vinyl ethyl sulfone, N-methyl-N-vinyl acetamide, N-vinyl pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used, and the compounds listed above are illustrative and not restrictive of the monomers suitable for use in this invention. Preferably, the monomer is selected from the group consisting of acrylonitrile, styrene, methyl methacrylate, and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumeme hydroperoxide, paramenthane hydroperoxide, di-α-cumyl-peroxide, dipropyl peroxide, diisopropyl peroxide, difuroyl peroxide, ditriphenylmethyl peroxide, bis(p-methoxybenzoyl)peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α, α'-azobis(2-methyl)heptonitrile, 1,1-azo-bis(1-cyclohexane)carbonitrile, dimethyl α, α,'-azobis(isobutyronitrile), 4,4'-azobis(cyanopetanoic) acid, azobis(isobutyronitrile), 1-t-amylazo- 1-cyanocyclohexane, 2-t-butylazo-2-cyano-4-methoxy-4-methylpentane, 2-t-butylazo-2-cyano-4-methylpentane, 2-(t-butylazo)isobutyronitrile, 2-t-butylazo-2-cyanobutane, 1-cyano-1-(t-butylazo)cyclohexane,t-butylperoxy-2-ethylhexanoate, t-butyl perpivalate, 2,5-dimethylhexane-2,5-diper-2-ethylhexoate, t-butylperneo-decanoate, t-butyl perbenzoate, t-butyl percrotonate, persuccinic acid, diisopropyl peroxydicarbonate, and the like; a mixture of initiators may also be used. Photochemically sensitive radical generators may also be employed. Generally from about 0.5 percent to about 10 percent, preferably from about 1 percent to about 4 percent, by weight of initiator based on the weight of the monomer will be employed in the final polymerization.

Stabilizers may be employed during the process of making the graft polymer dispersions. One such example is the stabilizer disclosed in U.S. Pat. No. 4,148,840, which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol.

The preferred polyols are polyethers having an average functionality of about 1.75 to about 3.0 and a molecular weight range of from about 3500 to about 5100. The most preferred polyols are polyethers which are copolymers of ethylene oxide and propylene oxide having a diol or triol initiator such as propylene glycol glycerine or trimethylolpropane. Included with this group are the previously described graft polymer dispersions.

Any suitable catalyst may be used including tertiary amines such as triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Other suitable catalysts are, for example, dibutyltin dilaurate, dibutyltin diacetate, stannous chloride, dibutyltin di-2-ethyl hexanoate, stannous oxide, available under the FOMREZ® trademark, as well as other organometallic compounds such as are disclosed in U.S. Pat. No. 2,846,408.

An alcohol having from about 10 to about 20 carbons or mixtures thereof may be used in the present invention. Alcohols of this type are known to those skilled in the art. The types of alcohols contemplated are commonly produced via the oxo process and are referred to as oxo-alcohols. Examples of some commercially available products include LIAL 125 from Chemica Augusta Spa or NEODOL® 25 produced by Shell.

A surface active agent is generally used for production of integral skin polyurethane foams of the present invention. Surfactants which may be used are those which aid in homogenizing or emulsifying the initial materials and may also be suitable for regulating cell structure. Typical examples are foam stabilizers such as siloxane oxyalkylene heterol polymers and other organic polysiloxanes, oxyethylated alkyl phenol, oxyethylated fatty alcohols, fluoroaliphatic polymeric esters, paraffin oils, castor oil ester, phthalic acid esters, ricindolic acid ester, and Turkey red oil, as well as cell regulators such as paraffins.

Chain extending agents employed in the present invention include those having two functional groups bearing active hydrogen atoms. A preferred group of chain extending agents includes ethylene glycol, diethylene glycol, propylene glycol, or 1,4-butanediol.

Additives which may be used in the process of the present invention include known pigments, such as carbon black, dyes, and flame retarding agents (e.g., tris-chloroethyl phosphates or ammonium phosphate and polyphosphate), stabilizers against aging and weathering, plasticizers, such as gamma butylactone, fungistatic and bacteriostatic substances, and fillers.

The main blowing and density controlling agent used according to the present invention is 1,1,1,2-tetrafluoroethane (HFC-134a). For the purpose of the invention, water may also be present in amounts up to and including 0.2 percent by weight based on the total weight of the nonisocyanate components. HFC-134a is used either alone or in conjunction with water in amounts sufficient to provide the desired foam density. For foams having sectional densities of from 25 pcf to about 35 pcf, the amount of HFC-134a used as the sole blowing agent will range from about 1.5 to about 6.0 percent by weight with the amount reduced when water is added as a co-blowing agent. When water is present in amounts of 0.05 to 0.1 percent by weight, the preferred range of HFC-134a is 1.5 to 2.5 percent by weight of the non-isocyanate components total weight.

The mechanical parameters of the instant process are flexible and depend on the final application of the integral skin polyurethane foam. The reaction system is versatile enough that it may be made in a variety of densities and hardnesses. The system may be introduced into a mold in a variety of ways known to those skilled in the art. It may be shot into a preheated closed mold via high pressure injection technique. In this manner, it processes well enough to fill complex molds at low mold densities (from 18 pcf to 25 pcf). It may also be run using a conventional open mold technique wherein the reaction mixture or system is poured or injected at low pressure or atmospheric pressure into a preheated open mold. In the instant process, the system may be run at mold temperatures from about room temperature to about 120° F. with room temperature being preferred.

Having thus described the invention, the following examples are given by way of illustration. All amounts are given in parts by weight unless otherwise indicated.

TEST METHODS

| | |
|---|---|
| Density ASTM D-1622 | Split Tear ASTM D-1938 |
| Tensile Strength ASTM D-412 | Graves Tear ASTM D-42 Die C |
| Tensile Elongation ASTM D-412, Die A | Shore Hardness ASTM D-2240 |
| Taber Abrasion ASTM 1044 | Ross Flex ASTM 1052 |

| | |
|---|---|
| Polyol A | is a propylene glycol initiated polyoxypropylene polyoxyethylene block copolymer having a hydroxyl number of about 25 and a molecular weight of about 3850. |
| Polyol B | is a 31 percent solids, 1:1, acrylonitrile:styrene graft copolymer dispersed, in a trimethylolpropane initiated polyoxypropylene-polyoxyethylene block copolymer having a molecular weight of about 4120. The graft polymer dispersion has a hydroxyl number of about 25. |
| Polyol C | is a glycerine initiated polyoxypropylene-polyoxyethylene block copolymer having a hydroxyl number of about 27 and a molecular weight of about 5050. |
| FSO 100 | is a telomer B monoether with polyethylene glycol, containing from 0.05 to 0.2 percent 1,4-dioxane. It is available from DuPont. |
| L-12771 | is fluoroaliphatic polymeric esters used as an emulsifier/surfactant. It is available from 3M. |
| FC-126 | is 80 to 90 percent ammonium perfluoro-octanate and 6 to 12 percent lower perfluoro-alkyl carboxylate salt used as an emulsifier/surfactant. It is available from 3M. |
| DC-193 | is a silicone surfactant available from Dow. |
| FC-430 | is fluoroaliphatic polymeric esters used as an emulsifier/surfactant. It is available from 3M. |
| FC-171 | is 50 percent aromatic naphtha and 50 percent fluoroaliphatic polymeric esters used as an emulsifier/surfactant. It is available from 3M. |
| FC-431 | is fluoroaliphatic polymeric esters used as an emulsifier/surfactant. It is available from 3M. |
| I-460 | is an amine catalyst blend of 25 percent triethylene diamine in 75 percent butanediol. |
| FC-740 | is a fluorinated alkyl alkoxylate used as an emulsifier/surfactant. It is available from 3M. |
| XFE-1028 | is an amine catalyst comprising a proprietary blend available from Air Products. |
| T-12 | is dibutyltin dilaurate. |
| L-5440 | is a silicone surfactant available from Union Carbide. |
| X2-5394 | is a silicone surfactant, specifically methyl(polyethylene oxide)bis(trimethylsiloxy)silane and polyethylene oxide allyl ether, available from Air Products. |
| HFC-134a | is 1,1,1,2-tetrafluoroethane. |
| Iso A | is a solvent-free 50/50 weight percent blend of diphenylmethane diisocyanate and a urethane-modified polymethylene polyphenylpolyisocyanate prepolymer, wherein the blend has an isocyanate content of 23 weight percent. |

TABLE 1

| SAMPLE | 1 | 2 | 3 | 4 |
|---|---|---|---|---|
| POLYOL A | 119.1 | 117.5 | 116.0 | 114.4 |
| POLYOL B | 38.6 | 38.08 | 37.58 | 37.08 |
| POLYOL C | 13.79 | 13.60 | 13.42 | 13.24 |
| 1,4-BUTANEDIOL | 11.95 | 11.79 | 11.63 | 11.48 |
| ETHYLENE GLYCOL | 0.367 | 0.362 | 0.358 | 0.353 |
| XFE-1028 | 2.025 | 1.998 | 1.972 | 1.946 |
| T-12 | 0.008 | 0.088 | 0.087 | 0.086 |
| L-5440 | 0.367 | 0.362 | 0.358 | 0.353 |
| HFC-134a | 4.759 | 4.694 | 4.632 | 4.571 |
| ISO A--INDEX/ AMOUNT | 100/71.87 | 105/74.44 | 110/76.95 | 115/79.39 |
| PHYSICALS | | | | |
| SECTIONAL DENSITY (pcf) | 32.01 | 31.44 | 31.42 | 31.6 |
| TENSILE STRENGTH (psi) | 337 | 326.6 | 336 | 308 |
| ELONGATION % AT BREAK | 310 | 226.6 | 200 | 156.6 |
| SPLIT TEAR (pi) | 50.1 | 40.1 | 32.7 | 32.7 |
| GRAVES TEAR (pi) | 97.0 | 86.6 | 76.0 | 73.1 |
| SHORE HARDNESS | 54 | 52 | 54 | 65 |
| TABER ABRASION (mg. lost, 18 wheel) | 199.4 | 126.7 | 110.7 | 89.4 |
| ROSS FLEX | | | | |
| K CYCLES TO FAIL | 0 | 0 | 17.4 | 15 |
| % CRACK AT FAIL | 0 | 0 | — | — |

** — equals failure.

TABLE 2

| SAMPLES | 1 | 2 | 3 | 4 | 5 | 6 | 7 | 8 | 9 | 10 |
|---|---|---|---|---|---|---|---|---|---|---|
| POLYOL A | 126.7 | 126.7 | 126.7 | 126.7 | 126.7 | 126.7 | 126.7 | 126.7 | 126.7 | 126.7 |
| POLYOL B | 37.9 | 37.9 | 37.9 | 37.9 | 37.9 | 37.9 | 37.9 | 37.9 | 37.9 | 37.9 |
| POLYOL C | 13.3 | 13.3 | 13.3 | 13.3 | 13.3 | 13.3 | 13.3 | 13.3 | 13.3 | 13.3 |
| 1,4-BUTANEDIOL | 11.4 | 11.4 | 11.4 | 11.4 | 11.4 | 11.4 | 11.4 | 11.4 | 11.4 | 11.4 |
| ETHYLENE GLYCOL | 0.38 | 0.38 | 0.38 | 0.38 | 0.38 | 0.38 | 0.38 | 0.38 | 0.38 | 0.38 |
| SURFACTANT 1-10 | 0.38 | 0.38 | 0.57 | 0.57 | 0.57 | 0.57 | 0.57 | 0.57 | 0.57 | 0 |
| XFE-1028 | 1.9 | 1.9 | 1.9 | 1.9 | 1.9 | 1.9 | 1.9 | 1.9 | 1.9 | 1.9 |
| T-12 | 0.047 | 0.047 | 0.047 | 0.047 | 0.047 | 0.047 | 0.047 | 0.047 | 0.047 | 0.047 |
| I-460 | 0.46 | 0.46 | 0.46 | 0.46 | 0.46 | 0.46 | 0.46 | 0.46 | 0.46 | 0.46 |
| HFC-134a | 4.9 | 4.9 | 4.9 | 4.9 | 4.9 | 4.9 | 4.9 | 4.9 | 4.9 | 4.9 |
| ISOCYANATE INDEX 100/ISO A | 69.0 | 69.0 | 69.0 | 69.0 | 69.0 | 69.0 | 69.0 | 69.0 | 69.0 | 69.0 |
| PHYSICALS | | | | | | | | | | |
| SECTIONAL DENSITY (pcf) | 26.9 | 29.3 | 29.5 | 29.7 | 27.8 | 29.9 | 28.6 | 30.2 | 28.7 | 28.6 |
| TENSILE STRENGTH (psi) | 185.5 | 130 | 151.5 | 155 | 191 | 144 | 193 | 164.5 | 108.3 | 174 |
| ELONGATION % AT BREAK | 220 | 157.5 | 170 | 175 | 235 | 187.5 | 245 | 179.5 | 150 | 207 |
| SPLIT TEAR (pi) | 40 | 34.4 | 40.9 | 47.3 | 33.8 | 19 | 34.6 | 39.6 | 34.6 | 33.5 |
| GRAVES TEAR (pi) | 66.9 | 58.5 | 64.5 | 53.7 | 76.6 | 53.9 | 60.2 | 70.6 | 52.1 | 62.4 |
| SHORE HARDNESS | 40 | 43 | 44 | 48 | 42 | 45 | 43 | 44 | 44 | 41 |
| TABER ABRASION (mg. LOST, 18 WHEEL) | 210.1 | 641.3 | 86.8 | 125.8 | 116.2 | 132.5 | 23.6 | 48 | 50.3 | 167.6 |
| ROSS FLEX | | | | | | | | | | |
| K CYCLES TO FAIL (500% CRACK) | >100 | 46 | >100 | >100 | >100 | 51 | >100 | 100 | >100 | >100 |
| % CRACK AT 100 K CYCLES | 0 | — | 0 | 0 | 0 | — | 0 | — | 0 | 0 |

1-10 SURFACTANTS USED IN EX. 1-10: 1 = DC-193; 2 = L-5440; 3 = FC-431; 4 = FC-126; 5 = L12771; 6 = FC-171; 7 = FC-740; 8 = FC-430; 9 = FSO100; 10 = NO SURFACTANT.
** — equals failure.

TABLE 3

| SAMPLES | 1 | 2 | 3 | 4 | 5 | 6 | 7 | 8 | 9 | 10 |
|---|---|---|---|---|---|---|---|---|---|---|
| POLYOL A | 123.74 | 123.2 | 122.3 | 121.94 | 121.41 | 121.04 | 120.56 | 120.09 | 119.37 | 119.51 |
| POLYOL B | 37.05 | 36.89 | 36.62 | 36.51 | 36.35 | 36.24 | 36.09 | 35.96 | 35.8 | 35.78 |
| POLYOL C | 12.62 | 12.91 | 12.81 | 12.78 | 12.72 | 12.68 | 12.63 | 12.58 | 12.53 | 12.52 |
| 1,4-BUTANEDIOL | 11.12 | 11.03 | 10.99 | 10.95 | 10.91 | 10.87 | 10.83 | 10.79 | 10.74 | 10.73 |
| ETHYLENE GLYCOL | 0.37 | 0.37 | 0.37 | 0.37 | 0.36 | 0.36 | 0.36 | 0.36 | 0.36 | 0.36 |
| XFE-1028 | 2.38 | 2.36 | 2.34 | 2.32 | 2.3 | 2.29 | 2.27 | 2.25 | 2.24 | 2.27 |
| T-12 | 0.048 | 0.047 | 0.046 | 0.046 | 0.048 | 0.049 | 0.045 | 0.045 | 0.044 | 0.045 |
| WATER | — | 0.094 | 0.19 | 0.28 | 0.37 | 0.457 | 0.545 | 0.631 | 0.7 | 0.18 |
| FREON 11a | — | — | — | — | — | — | — | — | — | 10.9 |
| HFC-134a | 4.58 | 4.1 | 3.6 | 3.35 | 2.65 | 1.73 | 1.13 | 0.45 | — | — |
| ISO A | 70.56 | 71.92 | 73.31 | 74.68 | 75.95 | 77.20 | 78.48 | 79.72 | 78.75 | 70.17 |
| PHYSICALS | | | | | | | | | | |
| SECTIONAL DENSITY (pcf) | 29.4 | 28.93 | 28.73 | 27.57 | 26.83 | 26.79 | 25.79 | 25.18 | 25.64 | 29.62 |
| TENSILE STRENGTH (psi) | 199.3 | 153.6 | 160 | 211 | 230 | 119.6 | 117.3 | 126.3 | 179.6 | 149 |
| ELONGATION % AT BREAK | 203.3 | 130 | 143.3 | 193.3 | 223 | 123.3 | 120 | 130 | 190 | 120 |
| SPLIT TEAR (pi) | 36.9 | 38.9 | 35.7 | 32.3 | 30.6 | 28.9 | 25.15 | 31.75 | 31.1 | 41.25 |
| GRAVES TEAR (pi) | 67.9 | 80.5 | 79.9 | 69.1 | 65.6 | 56.6 | 55.65 | 53.9 | 63.15 | 73.45 |
| SHORE HARDNESS | 43 | 44 | 39 | 43 | 42 | 38 | 34 | 32 | 33 | 48 |
| TABER ABRASION (mg. LOST, 18 WHEEL) | 261.7 | 55 | 73.9 | 22.6 | 30.6 | 109.8 | 148.9 | 94 | 57.4 | 254.4 |
| ROSS FLEX | | | | | | | | | | |
| K CYCLES TO FAIL | >100 | >100 | >100 | 78.7 | 64 | 10.6 | 9 | 14.8 | 16 | >100 |
| % CRACK AT FAIL | 0 | 0 | 0 | — | — | — | — | — | — | 0 |

** — equals failure

All samples were prepared in the same manner. Predetermined amounts of room temperature isocyanate and resin mixture were added to a container. The components were stirred using a high speed mixer at about 3000 rpm for eight to ten seconds. The contents were poured into a clean, dry 12"×6"×3/8" plaque mold. The mold was shut, and the foam was allowed to cure. The finished plaque was demolded and tested.

Table 1 shows the effect of varying the isocyanate index on typical formulation using HFC-134a as the sole blowing agent. Table 2 illustrates the effects of various emulsifiers/ surfactants compared with no surfactant (number 10). Table 3 illustrates a system co-blown with HFC-134a and water. Examples 9 and 10 are comparative examples. Example 9 uses water as the sole blowing agent. Example 10 uses a combination of water and Freon 11 a as a co-blowing system.

I claim:

1. A method of making low density, molded integral-skin polyurethane foam articles having enhanced performance properties, the method comprising:

providing an organic polyisocyanate A);

providing an isocyanate reactive hydroxyl functional polyol composition B) comprising:
  (i) one or more polyoxyalkylene polyether polyols, vinyl polymer grafted polyoxyalkylene polyether dispersions or mixtures thereof;
  (ii) a chain extender having two functional groups bearing active hydrogen atoms selected from the group consisting of aliphatic alcohols containing from 2 to 20 carbon atoms and mixtures thereof; and optionally,
  (iii) a $C_{10}$–$C_{20}$ aliphatic alcohol;
  (iv) a urethane promoting catalyst; and
  (v) a material selected from the group consisting of surfactants, fillers, pigments, antioxidants, and stabilizers;

introducing A) and B) into a mold;

reacting A) and B) in the presence of a blowing agent D) which is either 1,1,1,2-tetrafluoroethane or a mixture of 1,1,1,2-tetrafluoroethane and water, for a period of time sufficient to produce a molded integral skin polyurethane foam article, wherein the molded article has a flexibility and abrasion resistance such that it (1) has Ross Flex test results of 0% crack at 50,000 cycles and (2) has a loss of less than 200 mg in the Taber Abrasion test, 18 wheel.

2. The method of claim 1, wherein the blowing agent D) consists of 1.5 to 6.0 percent by weight 1,1,1,2-tetrafluoroethane and 0 to 0.2 percent by weight water, based on the weight of all nonisocyanate components.

3. The method of claim 1, which produces molded integral skin polyurethane articles having a density of between 25 to 35 pcf.

4. The method of claim 1, wherein the molded integral skin polyurethane articles are shoe soles.

5. The method of claim 1, which produces molded integral skin polyurethane articles having a flexibility and abrasion resistance such that they (1) have Ross Flex test results of 0% crack at 100,000 cycles and (2) have a loss of less than 150 mg in the Taber Abrasion test, 18 wheel.

6. The composition of claim 1 and wherein the chain extender is further selected from the group consisting of ethylglycol, diethylene glycol, propylene glycol, dipropylene glycol, butanediol, and mixtures thereof.

* * * * *